April 10, 1945.   C. L. WAGNER   2,373,634
PRESSURE-SENSITIVE ADHESIVE TAPE
Filed Nov. 15, 1943
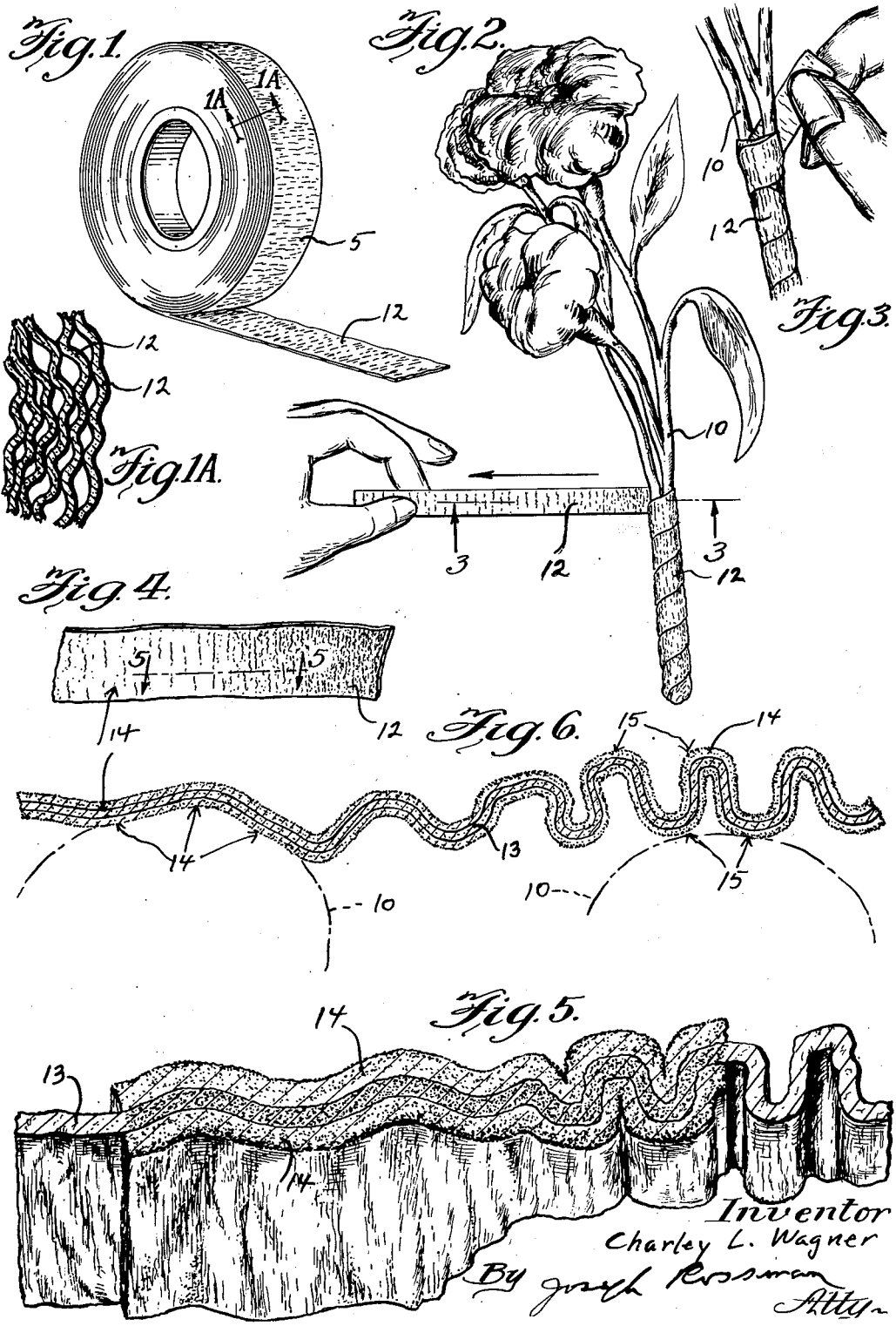
Inventor
Charley L. Wagner
By Joseph Rossman
Atty.

Patented Apr. 10, 1945

2,373,634

UNITED STATES PATENT OFFICE 2,373,634

PRESSURE-SENSITIVE ADHESIVE TAPE

Charley L. Wagner, Menasha, Wis., assignor to Marathon Corporation, a corporation of Wisconsin Application November 15, 1943, Serial No. 510,341

4 Claims. (Cl. 117—122)

This invention relates to a pressure sensitive adhesive sheet material tape. More specifically this invention relates to a creped paper tape provided with a coating comprising microcrystalline wax which is pressure-sensitive and can be autogeneously sealed to itself merely by application of manual pressure alone.

Hitherto, many different types of compositions have been suggested for making pressure-sensitive tapes. These prior compositions involve the use of expensive ingredients such as rubber, resins and the like which are at present very difficult to obtain for ordinary uses. Furthermore, such compositions are difficult to compound and to apply to sheet materials. A still further difficulty encountered is that such compositions are normally very tacky and cause undesirable blocking or sticking together of stacked sheets or convolutions of the coated sheet when wound in roll form.

These difficulties and disadvantages have been fully overcome by my invention by the use of specially selected wax compositions which have surprising and unexpected pressure-sensitive properties under normal conditions of use.

Further advantages and essential features of the invention will be fully disclosed in the following specification and appended drawing wherein, Figure 1 is a perspective view of a roll of pressure sensitive tape made in accordance with my invention, Figure 1A is an enlarged sectional view taken on lines 1A—1A of Figure 1, Figure 2 is a perspective view of an illustrative use of my tape for making floral bouquets, Figure 3 is a perspective fragmental view showing the manner of applying my tape to the flower stems as viewed along lines 3—3 of Figure 2.

Figure 4 is an enlarged view of a piece of my tape, a portion of same being in partially stretched condition, Figure 5 is an enlarged sectional view taken on lines 5—5 of Figure 4, Figure 6 is an enlarged sectional view of the tape, a portion of same being in partially stretched condition.

Referring to the drawing, illustrating an exemplary embodiment of my invention, the pressure-sensitive tape 12 made in accordance with my invention consists essentially of a suitably creped sheet material 13, preferably paper of any desired basis weight and strength, treated with a specially prepared thermoplastic wax composition, indicated by numeral 14, which is pressure-sensitive at normal conditions. The wax composition may be applied to the creped sheet material in any suitable manner, such as by melting the composition and passing the sheet therethrough and then cooling. The molten composition may also be applied by suitable coating rolls after which it is chilled to harden same. The composition is applied so that a continuous flexible pressure-sensitive surface layer or film 14 of the composition will be present on both sides of the sheet without disturbing the original creping formation of the sheet and the creped sheet remains substantially unstretched or distorted after the coating operation. The coated sheet material may then be slit and wound in rolls 5 of suitable size and dimensions as shown in Figure 1, or in sheets of any suitable dimensions.

A very satisfactory pressure-sensitive tape suitable for florist use is made in accordance with my invention by using, for example, a 14 lb. basis weight paper tissue sheet (ream 480—24x36) creped to 25 lb. basis weight and then coated with my composition to a final basis weight of say about 60 to 65 lbs. per ream. I prefer to crepe the base sheet so that it will have a fine degree of crepe and of high crepe ratio so as to be stretchable anywhere from about 50 to 200% of its original length from initial creped condition. It is preferred to use a sheet having a fine crepe, smooth uniform surfaces, and a high degree of flexibility and elasticity or stretch. The flexible coating composition which I produce will maintain its adhesion to the base sheet in its final stretched condition.

A pressure-sensitive coating which has such characteristics is provided in accordance with my invention by using suitably selected microcrystalline waxes or blends of suitably selected microcrystalline waxes. These microcrystalline waxes are generally found in high boiling or residual fractions of petroleum oils. The waxes are generally removed by centrifuging with solvents or by cold-settling from solvents. These waxes may be processed further by recrystallization to alter their properties. If a single microcrystalline wax is not available having this critical penetration value I may blend two or more available microcrystalline waxes to obtain this final penetration value for coating my creped sheet material. I prefer to use microcrystalline wax having a drop melting point from about 130° F. to about 180° F. (A. S. T. M. method D127-30) and needle penetration values from about 10 to about 60 at 77° F. (A. S. T. M. method D5-25). The tackiness, adhesion and hardness of the microcrystalline wax may be modified by adding to it paraffin wax in amounts up to about 25% by weight, or other hard waxes such as carnauba wax, montan wax and candelilla wax. Other tack modifiers such as talc, starch, aluminum stearate, mica and the like may also be added depending upon the type of microcrystalline wax used.

A tape made in accordance with my invention is particularly suitable for use as a floral binding tape and for general horticultural purposes such as for splicing, grafting, etc. In use the tape is applied by simply wrapping it in slightly overlapping convolutions as shown in Figure 2. The tape is preferably slightly stretched as it is applied so as to ensure adhesion of the contacting portions of the tape. When the tape is in its original creped condition in roll form as shown in Figure 1, the convolutions will not block or adhere to each other at temperatures as high as 110° F., but will remain in the condition shown in Figure 1A. This is due to the fact that only the series of ridges or peaks 15 of the corrugations in the creped sheet make contact with adjacent convolutions, as illustrated in the right hand portion of the tape shown in Figure 6. The major portion of the coating film 14 is thus not in contact with any adjacent surface and very slight adhesion therefore occurs only at the ridges. However, when the tape is in stretched more nearly flattened condition as shown in the left hand portion of Figure 6 the ridges are smoothed out or removed so that the coating film 14 can now make substantially full face contact with an adjacent surface 10. Accordingly, when it is desired to apply my tape to any desired surface or article the tape is stretched so as to bring the surface film more fully into contact with the article and upon simple application of pressure by the fingers firm adhesion will result. When the tape is stretched it will not contract to its original length but will remain permanently in its stretched condition.

My tape may be used also for general utility purposes, such as for mending or bonding together any articles, for covering handle grips, for sealing closures, for tying packages, as a mounting tissue for printed matter, photographs and the like. My sheet material may also be used for general wrapping and packaging purposes, the overlapped portions of the wrapper being simply pressed together with or without the aid of heat to form a tight seam for completing the package. The base sheet may be suitably colored or printed if desired. The coating composition may also be colored if desired by adding any suitable dyes or pigments thereto. On account of the high degree of pliability my sheet material can be made to conform by differential stretching to articles of any kind of contour and it will readily conform to such contour and cling thereto upon application of pressure. The sheet will not spring back after it is so applied, but will adhere firmly to itself and to the object to which it is applied.

Having fully disclosed the essential and significant features of my invention, I claim:

1. Pressure sensitive adhesive tape comprising a flexible backing sheet of creped paper coated with a pressure-sensitive continuous flexible coating composition containing microcrystalline wax as a major ingredient, said coating maintaining its adhesion to the backing sheet when stretched to increase the pressure sensitive adhesiveness of said tape, said backing sheet being creped before being coated with said composition in hot molten condition and having the initial creping formation substantially unaltered.

2. Pressure sensitive adhesive tape comprising a flexible backing sheet of creped paper coated with a pressure-sensitive continuous flexible coating composition containing microcrystalline wax as a major ingredient and a tack modifying ingredient, said coating maintaining its adhesion to the backing sheet when stretched to increase the pressure sensitive adhesiveness of said tape, said backing sheet being creped before being coated with said composition in hot molten condition and having the initial creping formation substantially unaltered.

3. Pressure sensitive adhesive tape comprising a flexible backing sheet of creped paper coated with a pressure-sensitive continuous flexible coating composition containing microcrystalline wax as a major ingredient and up to about 25% by weight of paraffin wax, said coating maintaining its adhesion to the backing sheet when stretched to increase the pressure sensitive adhesiveness of said tape, said backing sheet being creped before being coated with said composition in hot molten condition and having the initial creping formation substantially unaltered.

4. Pressure sensitive sheet material consisting of creped paper having a pressure-sensitive surface coating composition comprising as a major ingredient microcrystalline wax having a drop melting point from about 130° F. to about 180° F. (A. S. T. M. method D127-30) and needle penetration values from about 10 to about 60 at 77° F. (A. S. T. M. method D5-25), said coating being flexible and maintaining its adhesion to the creped paper in stretched condition to increase the pressure sensitive adhesiveness of said sheet material, said sheet material being creped before being coated with said composition in hot molten condition and having the initial creping formation substantially unaltered.

CHARLEY L. WAGNER.